United States Patent
Burian et al.

(10) Patent No.: US 6,616,123 B2
(45) Date of Patent: Sep. 9, 2003

(54) HOPPER TEE MOUNTING ASSEMBLY (75) Inventors: William F. Burian, Downers Grove, IL (US); Charles Lonnie Horne, Chicago, IL (US); James M. McLaughlin, Monee, IL (US); Michael S. Ryan, Darien, IL (US); Clayton Strand, Bolingbrook, IL (US); Malinda Chilcote, Aurora, IL (US)

(73) Assignee: Salco Products, Inc., Lemont, IL (US)

( * ) Notice: Subject to any disclaimer, the term of this patent is extended or adjusted under 35 U.S.C. 154(b) by 0 days.

(21) Appl. No.: 10/014,396

(22) Filed: Oct. 26, 2001

(65) Prior Publication Data
US 2003/0080310 A1 May 1, 2003

(51) Int. Cl.7 .................................................. F16K 1/22
(52) U.S. Cl. ........................................ 251/144; 251/305
(58) Field of Search ................................. 251/144, 305, 251/306, 307, 308

(56) References Cited

U.S. PATENT DOCUMENTS

| | | | | |
|---|---|---|---|---|
| 1,901,016 A | * | 3/1933 | West et al. ................. 251/250 |
| 4,014,511 A | * | 3/1977 | Uno ........................... 251/306 |
| 4,030,524 A | * | 6/1977 | McMath et al. ......... 251/149.9 |
| 4,653,724 A | * | 3/1987 | Garrigues et al. .......... 251/306 |
| 4,678,159 A | * | 7/1987 | Gardner et al. ............. 251/107 |
| 4,809,948 A | * | 3/1989 | Gardner et al. ............. 251/107 |
| 4,822,001 A | * | 4/1989 | Sisk ........................... 251/306 |
| 5,842,681 A | | 12/1998 | Sisk |
| 6,213,449 B1 | * | 4/2001 | Portis et al. ................ 251/144 |

* cited by examiner

Primary Examiner—Gene Mancene
Assistant Examiner—John Bastianelli
(74) Attorney, Agent, or Firm—Jenner & Block, LLC (57) ABSTRACT A hopper tee mounting assembly capable of accommodating a valve member within the hopper tee mounting assembly. The hopper tee mounting assembly comprises an upper plate having a plurality of upwardly extending bolts, a lower plate having a plurality of downwardly extending bolts, a hinge assembly allowing the upper plate and the lower plate to pivot relative to each other, and a latch assembly to latch the upper plate together with the lower plate.

23 Claims, 7 Drawing Sheets

HOPPER TEE MOUNTING ASSEMBLY

BACKGROUND OF THE INVENTION

The present invention relates to hopper tee mounting assemblies for mounting hopper tees to the discharge end of hoppers. More specifically, it relates to a hopper tee mounting assembly for mounting a hopper tee to the discharge end of a hopper which can be easily opened.

Hopper or tank trailers are commonly used to transport dry bulk such as industrial and food products. The trailer has a plurality of funnel shaped hoppers located at the bottom of the trailer. Defined at the lower most end of each hopper is a discharge outlet. Attached to each discharge outlet is a valve member and a hopper tee. The hopper tee has a vertical section and a horizontal section forming the tee configuration. The valve member is located between the discharge end of the hopper and the top of the hopper tee. A plurality of bottom line piping connects the horizontal sections of the hopper tee to allow the dry bulk to be discharged from a single discharge opening.

When the hopper trailer reaches its destination, the dry bulk is unloaded. The unloading process involves attaching a discharge pipe to the discharge opening of the trailer. The valve members are then positioned to the opened position such that the dry bulk is able to flow freely into the hopper tees. Thereafter, a reduced pressure in the discharge pipe suctions the dry bulk through the bottom lines and into the discharge pipe.

Although the prior art hopper tee assemblies function well for their intended purposes, there are several problems associated with the prior art valve member and hopper tee assemblies. The prior art valve member and the hopper tee assemblies are bolted to a flange located at the bottom of the hopper. To gain access to the valve member or the interior of the hopper tee, a wrench must be used to unbolt the bolts that hold the hopper tee and the valve member to the flange. The process of unbolting the bolts is very time consuming.

U.S. Pa. No. 5,842,681 to Sisk addresses the concern of having to remove the bolts to gain access to the valve member or the interior of the hopper tee, by replacing the conventional flange, the valve member and the hopper tee with a swing-away hopper tee assembly. While the Sisk hopper assembly can be easily opened without the necessity of unbolting, the Sisk hopper assembly is significantly taller than the conventional valve member and hopper tee which it replaces. Therefore, to retrofit a trailer with the Sisk hopper assembly, the bottom of each hopper would need to be reduced to accommodate for the increased height of the Sisk hopper assembly. Such a retrofitting process is very time consuming and costly.

Therefore, there exists a need for a hopper assembly which can be opened without the necessity of unbolting and still have the same height as the parts which it replaces.

SUMMARY OF THE INVENTION

This invention relates to a hopper tee mounting assembly capable of accommodating a valve member within the hopper tee mounting assembly. The hopper tee mounting assembly comprises an upper plate having a plurality of upwardly extending bolts, a lower plate having a plurality of downwardly extending bolts, a hinge assembly allowing the upper plate and the lower plate to pivot relative to each other, and a latch assembly to latch the upper plate together with the lower plate.

DETAILED DESCRIPTION OF THE EMBODIMENTS

Figure 1:
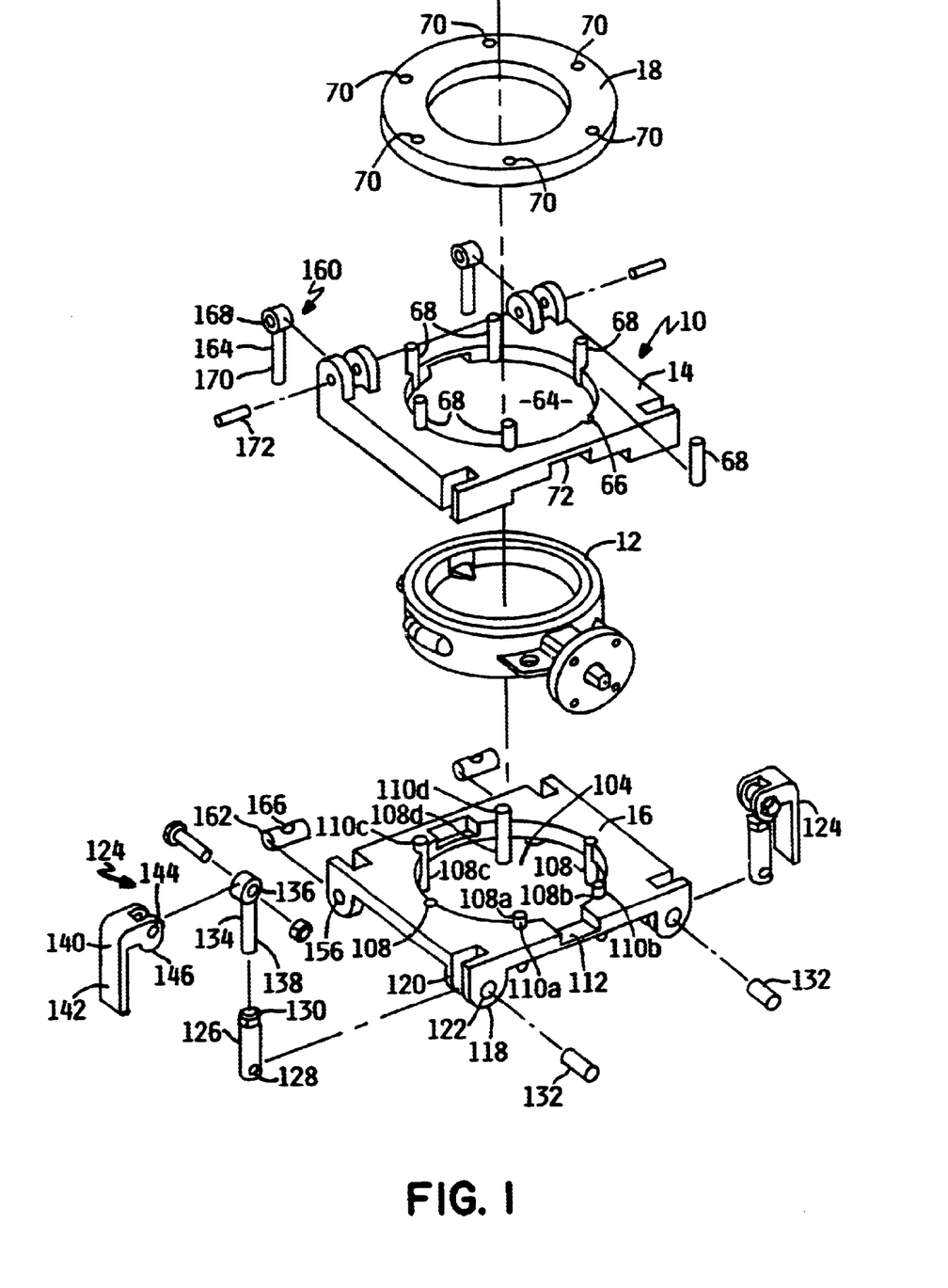
FIG. 1 is a perspective view of a hopper tee mounting assembly of the present invention and a valve member, prior to assembling the hopper tee mounting assembly.
Figure 2:
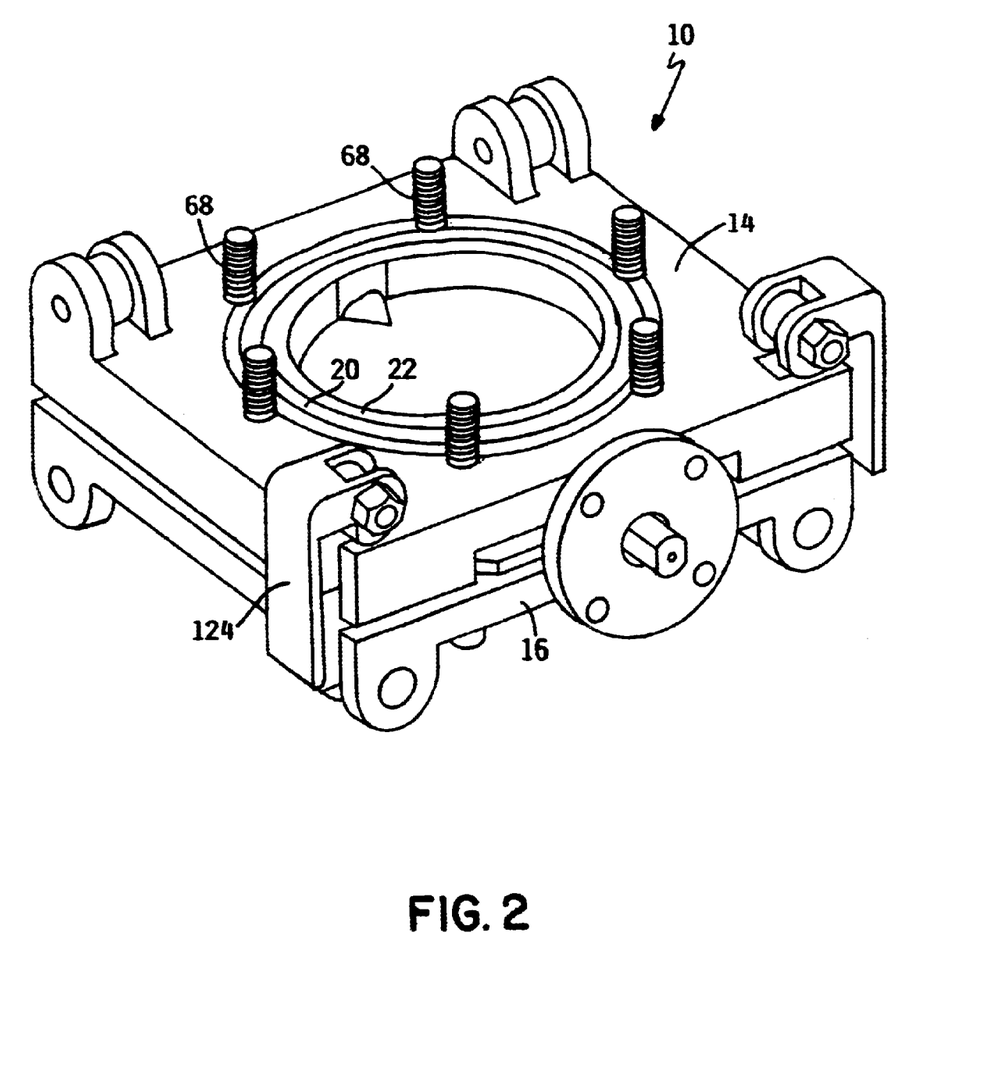
FIG. 2 is a perspective view of the hopper tee mounting assembly and the valve member of FIG. 1 as assembled.

FIG. 1 illustrates a hopper tee mounting assembly 10 in accordance to the present invention and a valve member 12, prior to assembling the hopper tee mounting assembly 10. FIG. 2 illustrates the hopper tee mounting assembly 10 and the valve member 12 as assembled.

The hopper tee mounting assembly 10 includes an upper plate 14 and a lower plate 16. The upper plate 14 is adapted to be connected to a flange 18 attached or welded to the bottom of a hopper (not shown). The lower plate 16 is adapted to be connected to the top of a hopper tee (not shown). Positioned between the upper plate 14 and the lower plate 16 is the valve member 12.

Figure 11:
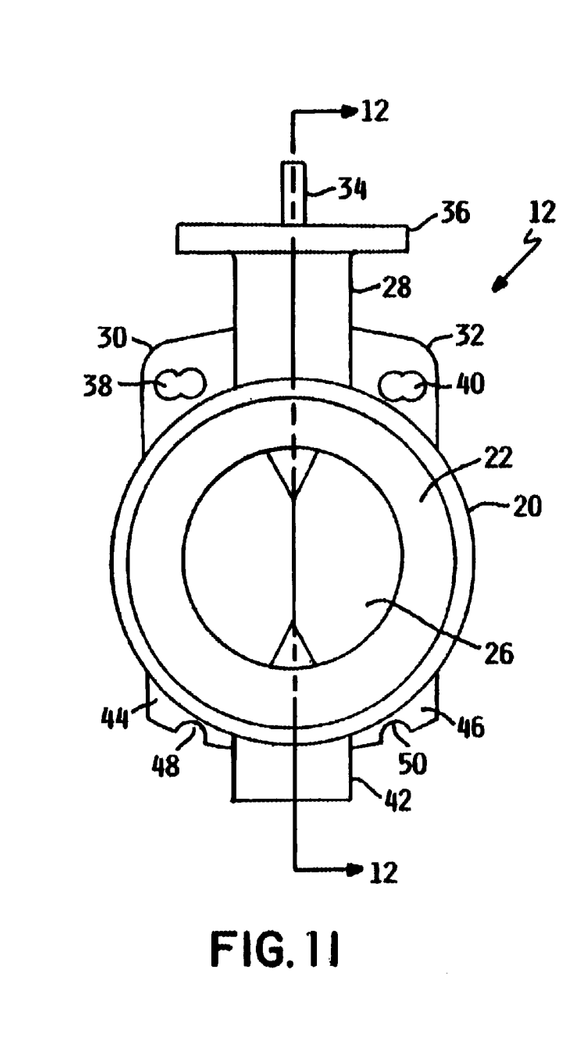
FIG. 11 is a top view the valve member of FIG. 1.
Figure 12:
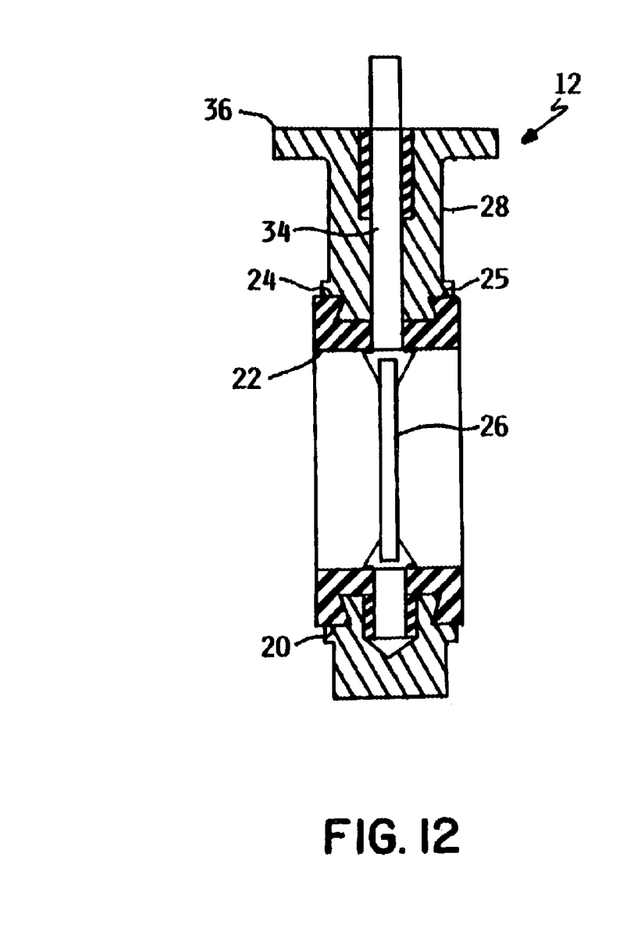
FIG. 12 is a sectional view of the valve member of FIG. 11, as taken along line 12—12.

The valve member 12 is illustrated in FIGS. 1 land 12. The valve member 12 has a rigid cylindrical body 20 and a resilient seal 22 located immediately radially inwardly of the rigid cylindrical body 20. One end of the resilient seal 22 protrudes slightly upwardly of the upper surface 24 of the cylindrical body 20. The upwardly protruded portion of the resilient seal allows the resilient seal 22 to be compressed against the flange 18 to create an effective seal between the valve member 12 and the flange 18. The other end of the resilient seal 22 protrudes slightly downwardly of the lower surface 25 of the cylindrical body 20. The downwardly protruded portion of the resilient seal allows the resilient seal 22 to be compressed against the top of the hopper tee to create an effective seal between the valve member 12 and the hopper tee. Radially inwardly of the resilient seal 22 is a butterfly valve 26. The butterfly valve 26 rotates between an opened position and a closed position to control the flow of dry bulk from the hopper to the hopper tee. A front boss 28 and two front retaining brackets 30,32 extend from the front of the cylindrical body 20. The butterfly valve 26 is attached to a stem 34 extending through a bore defined in the front boss 28. The butterfly valve 26 can be manually actuated by an external handle (not shown) attached to a handle mounting flange 36. Each front retaining bracket 30,32 has a retaining aperture 38,40 defined in the front retaining bracket 30,32. A rear boss 42 and two rear retaining brackets 44,46 extend from the rear of the cylindrical body 20. The rear boss 42 has a bore defined therein for retaining the end of the stem 34. Each rear retaining bracket 44,46 has a retaining aperture 48,50 defined in the rear retaining bracket 44,46.

Figure 3:
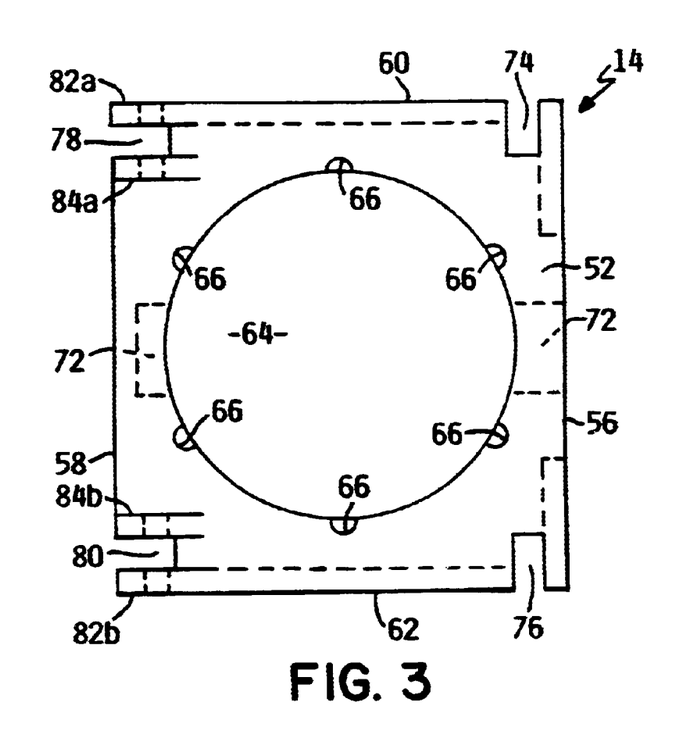
FIG. 3 is a top view of an upper plate of the hopper tee mounting assembly of FIG. 1.
Figure 4:
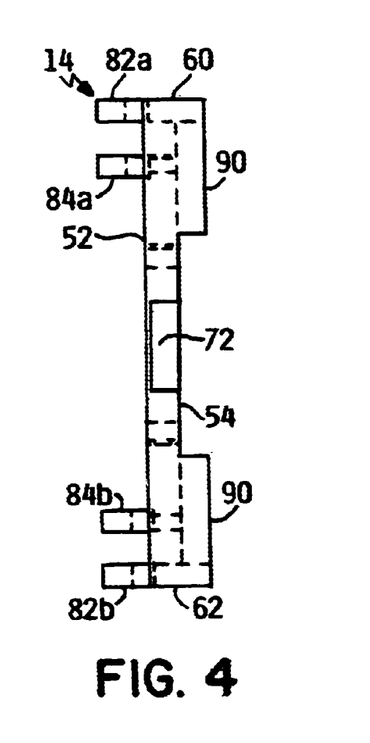
FIG. 4 is a front view of the upper plate of FIG. 3.
Figure 5:
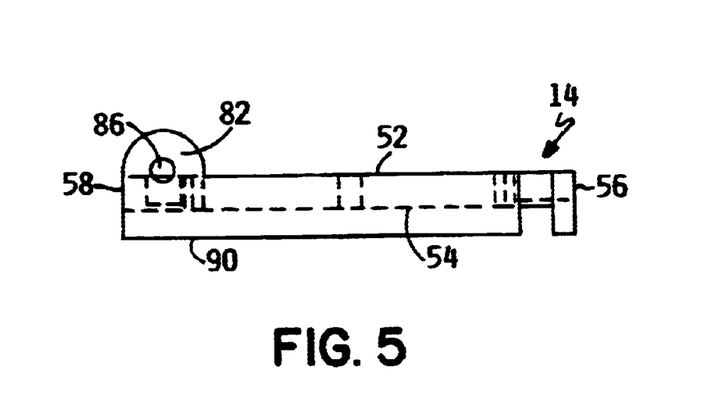
FIG. 5 is a side view of the upper plate of FIG. 3.

The upper plate 14 is illustrated in FIGS. 3–5. The upper plate 14 has an upper surface 52, a lower surface 54, a front surface 56, a rear surface 58 and two side surfaces 60,62. An upper valve member opening 64 is defined in upper plate 14 and extends from the upper surface 52 to the lower surface 54 of the upper plate. The upper valve member opening 64 is sized such that its diameter is greater than the outer diameter of the cylindrical body 20 of the valve member 12 allowing the cylindrical body 20 to fit into the upper valve member opening 64. Six equally space bolt circles 66 are defined at the radial surface of the upper valve member opening 64. The bolt circles 66 are sized to accommodate upwardly extending bolts 68 extending upwardly from the upper surface 52 of the upper plate 14. The bolts 68, and the corresponding bolts circles 66, are positioned to match the position of the holes 70 of the mating flange 18. While the present invention illustrates six equally spaced bolts 68 and bolt circles 66, the number of bolts 68 and bolts circles 66 would depend on the hole pattern of the mating flange 18. For example, flanges attached to larger sized hopper discharge openings have eight holes rather than six holes. Therefore, the upper plate of the present invention, when used in conjunction with the larger flange, would have eight equally spaced bolts extending from the upper surface of the upper plate.

The upper plate 14 has a groove 72 defined at the lower surface 54 of the upper plate. The groove 72 extends from the front surface 56 of the upper plate 14 to a terminal surface located between the upper valve member opening 64 and the rear surface 58 of the upper plate 14. The groove 72 is sized to accommodate the front boss 28 and the rear boss 42 of the valve member.

Defined inwardly from each of the side surface 60,62 of the upper plate 14 is a latch slot 74,76. The latch notches 74,76 are located near the front of the upper plate at a given distance from the front surface 56 of the upper plate 14. Defined inwardly from the rear surface 58 of the upper plate 14 are two pivot slots 78,80. Adjacent each of the pivot slot 78,80 are two semi-circle shaped pivot lobes 82a,84a,82b, 84b. The pivot lobes 82a,84a,82b,84b extend upwardly from the upper surface 52 of the upper plate 14. Defined and extending through each pivot lobe is a pivot hole 86.

A plurality of downwardly extending ledges 90 extends downwardly a given distance from the lower surface 54 of upper plate 14 along portions of the perimeter of the upper plate 14. The ledges 90 are non-continuous around the perimeter of the upper plate to permit the latch slots 74,76 and the pivot slots 78,80 to be exposed. The ledges 90 also terminate at given distances from the groove 72 to provide clearance for the front boss 28 and the front retaining brackets 30,32 of the valve member 12.

Figure 6:
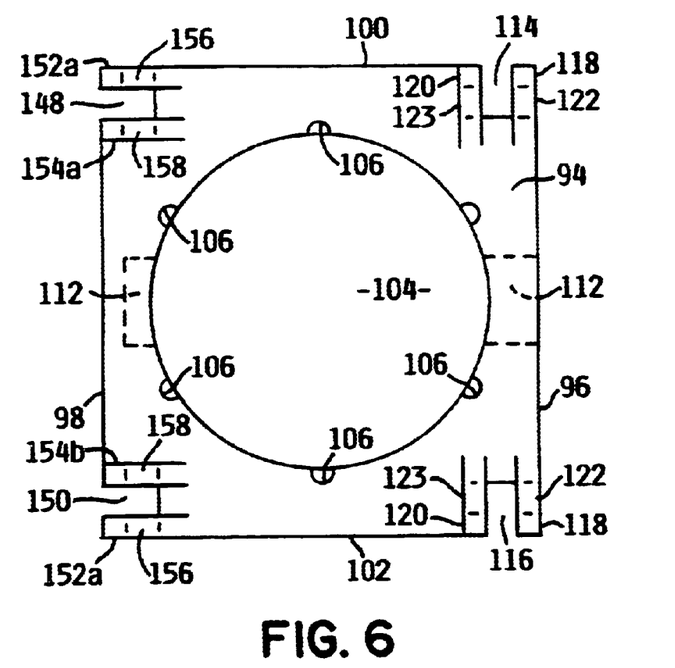
FIG. 6 is a bottom view of a lower plate of the hopper tee mounting assembly of FIG. 1.
Figure 7:
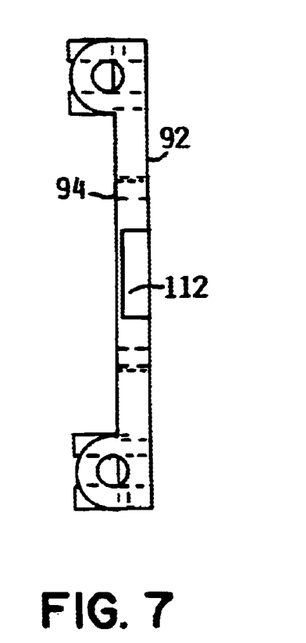
FIG. 7 is a front view of the lower plate of FIG. 6.
Figure 8:
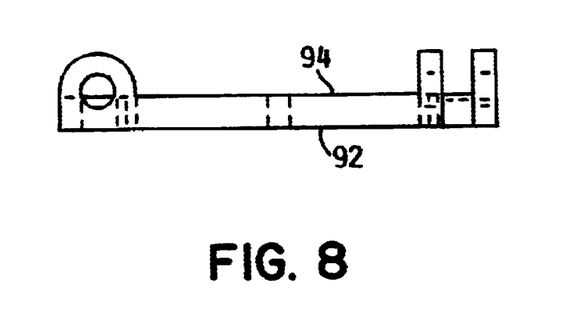
FIG. 8 is a side view of the lower plate of FIG. 6.

The lower plate 16 is illustrated in FIGS. 6–8. The lower plate 16 has an upper surface 92, a lower surface 94, a front surface 96, a rear surface 98 and two side surfaces 100,102. A lower valve member opening 104 is defined in the lower plate 16 and extends from the upper surface 92 to the lower surface 94 of the lower plate. The lower valve member opening 104 is sized such that its diameter is greater than the outer diameter of the cylindrical body 20 of the valve member 12 allowing the cylindrical body 20 to fit into the lower valve member opening 104. Furthermore, the diameter of the lower valve member opening 104 is approximately equal to the diameter of the upper valve member opening 64. Six equally spaced downwardly extending bolt circles 106 are defined at the radial surface of the lower valve member opening 104. The bolt circles 106 are sized to accommodate the downwardly extending bolts 108 extending downwardly from the lower surface 94 of the lower plate 16. The bolts 108, and the corresponding bolt circles 106, are positioned to match with the hole pattern of the hopper tee (not shown). Furthermore, it is preferable that each of the downwardly extending bolts 108 of the lower plate 16 has a corresponding upwardly extending bolt 68 of the upper plate 14 in which the axes of the two bolts are approximately aligned. The two downwardly extending bolts 108a,108b located near the front of the lower plate 16 and the two downwardly extending bolts 108c,108d located near the rear of the lower plate 16 further have an upwardly extending portion 110a,110b,110c,110d extending upwardly a given distance from the upper surface 92 of the lower plate 16, towards the upper plate 14. The upwardly extending portion 110a,110b of the two bolts 108a,108b located near the front of the lower plate 16 are positioned to be inserted into the front retaining apertures 38,40 defined in the front brackets 30,32 of the valve member 12 to retain and align the valve member 12. The upwardly extending portion 110c,110d of the two bolts 108c,108d located near the rear of the lower plate 16 are positioned to be inserted into the rear retaining apertures 48,50 defined in the rear brackets 44,46 of the valve member 12 to retain and align the valve member 12.

The lower plate 16 has a groove 112 defined at the upper surface of the lower plate 16. The groove 112 extends from the front surface 96 of the lower plate 16 to a terminal surface located between the lower valve member opening 104 and the rear surface 98 of the lower plate 16. The groove 112 is sized to accommodate the front boss 28 and the rear boss 42 of the valve member 12.

Defined inwardly from each of the side surfaces 100,102 of the lower plate 16 is a latch slot 114,116. The latch notches 114,116 are located near the front of the lower plate at a given distance from the front surface 96 of the lower plate 16. Adjacent each of the latch slots 114,116 are two semi-circular shaped latch lobes 118a,120a,118b,120b. The latch lobes 118,120 extend downwardly from the lower surface 94 of the lower plate 16. Defined and extending through each latch lobe 118,120 is a latch hole 122,123.

Two latch assemblies 124 are used to latch together the upper plate 14 with the lower plate 16. Each latch assembly 124 has a tubular stem 126 with a hole 128 defined perpendicular to the axis of the stem at one end of the stem 126 and a threaded bore 130 defined along the axis of the stem at the other end of stem 126. A pin 132 is inserted through the latch holes 122,123 defined in the latch lobes 118,120, and the hole 128 defined in the tubular stem 126 to pivotably retain the latch assembly 124 to the lower plate 116. To allow the tubular stem 126 to pivot relative to the pin 132, the diameter of hole 128 should be sized slightly larger than the outer diameter of the pin 132. Each latch assembly 124 further includes an eyebolt 134. The eyebolt 134 has a hole 136 defined perpendicular to the axis of the eyebolt at one end of the eyebolt 134 and external threads 138, which mates with the threaded bore 130 of the stem 126, at the other end of the eyebolt 134. By rotating the eyebolt 134 relative to the stem 126, the overall axial length of the latch assembly 124 can be increased or decreased. This allows the latch assembly 124 to be adjusted to a desired axial length for properly latching the upper plate 14 with the lower plate 16. A latch 140 is pivotably mounted to the eyebolt 134. The latch 140 has a handle 142 at one end of the latch to allow an operator to manually rotate the latch. The latch 140 defines a hole 144 and a cammed surface 146 at the other end of the latch 140. The contour of the cammed surface 146 allows the cammed surface 146 to the engage the upper surface 52 of the upper plate 14 when the latch 140 is rotated to a latched position, and allows the cammed surface 146 not to engage the upper surface 52 of the upper plate 14 when the latch is rotated to an unlatched position.

Defined inwardly from the rear surface 98 of the lower plate 16 are two pivot slots 148,150. Adjacent each of the pivot notches 148,150 are two semi-circular shaped pivot lobes 152a,154a,152b,154b extending downwardly from the lower surface 94 of the lower plate 16. Defined and extending through each pivot lobe 152,154 is a pivot hole 156,158.

Two hinge assemblies 160 allow the upper plate 14 and lower plate 16 to pivot relative to each other. Each hinge assembly 160 includes a hinge pin 162 and an eyebolt 164. The hinge pin 162 extends through the pivots holes 156,158 of each set of pivot lobes 152,154. The hinge pin 162 has a threaded hole 166 defined perpendicular to the axis of the hinge pin. The diameter of the hinge pin 162 is sized slightly smaller than the diameter of the pivot holes 156,158 allowing the pivot pin 162 to pivot relative to the pivot lobes 152,154 of the lower plate 16. The eyebolt 164 has a hole 168 defined perpendicular to the axis of the eyebolt at one end of the eyebolt and external threads 170, which mates with the threaded hole 166 of the hinge pin 162, at the other end of the eyebolt. A retaining pin 172 is inserted through the pivot holes 156,158 defined in each set of pivot lobes 152,154 and the hole 168 of the eyebolt 164. The diameter of the retaining pin 172 is sized slightly smaller than the diameter of the hole 168 of the eyebolt 164 allowing the eyebolt 164 to pivot relative to the pivot lobes 62,64 of the upper plate 14.

The hopper tee mounting assembly 10 of the present invention can be pivotably opened to allow the removal of the valve member 12 for cleaning or servicing. The hopper tee mounting assembly 10 can be easily opened by rotating the latches 140 from the latched position to the unlatched position. By rotating the latches 140 to the unlatched position, the cammed surfaces 146 are disengaged from the upper surface 52 of the upper plate 14. This then allows each of the latch assemblies 124 to pivot outwardly out of the corresponding latch slot 74,76 of the upper plate 14. Once both latch assemblies 124 are pivoted out of their corresponding latch slots 74,76, the lower plate 16 is able to pivot freely relative to the upper plate 14 along the hinge assemblies 160. With the hopper tee mounting assembly 10 pivotably opened, the valve member 12 can be removed by lifting it upwardly away from the lower plate 16. The reverse sequence of the opening procedure is used to close the hopper tee mounting assembly 10.

A feature of the present invention is that the hopper tee mounting assembly 10 can be easily opened and still have approximately the same height as the parts which it replaces. Having the same height as the parts which it replaces is accomplished by having the hopper tee mounting assembly 10 be located radially outwardly of the valve member 12. Therefore, no portion of the hopper tee mounting assembly 10 is located directly above the cylindrical body 20 of the valve member or directly below the cylindrical body 20 of the valve member 12. Such a design allows the upper surface 52 of the upper plate 14 immediately radially outwardly of the upper valve member opening 64, which mates with the flange 18, to be approximately flush with the top surface 24 of the rigid cylindrical body 20 of the valve member 12; and the lower surface 94 of the lower plate 16 immediately radially outwardly of the lower valve member opening 104, which mates with the hopper tee, to be approximately flush with the lower surface 25 of the rigid cylindrical body 20. The term "flush" is defined in this application as meaning that the plane defined by one surface is the same plane defined by the other surface. Such a design also allows the resilient seal 22 and the upper surface 24 of the rigid cylindrical body 20 to directly abut the flange 18, and the resilient seal 22 and the lower surface 54 of the rigid cylindrical body 20 to abut the hopper tee.

Figure 9:
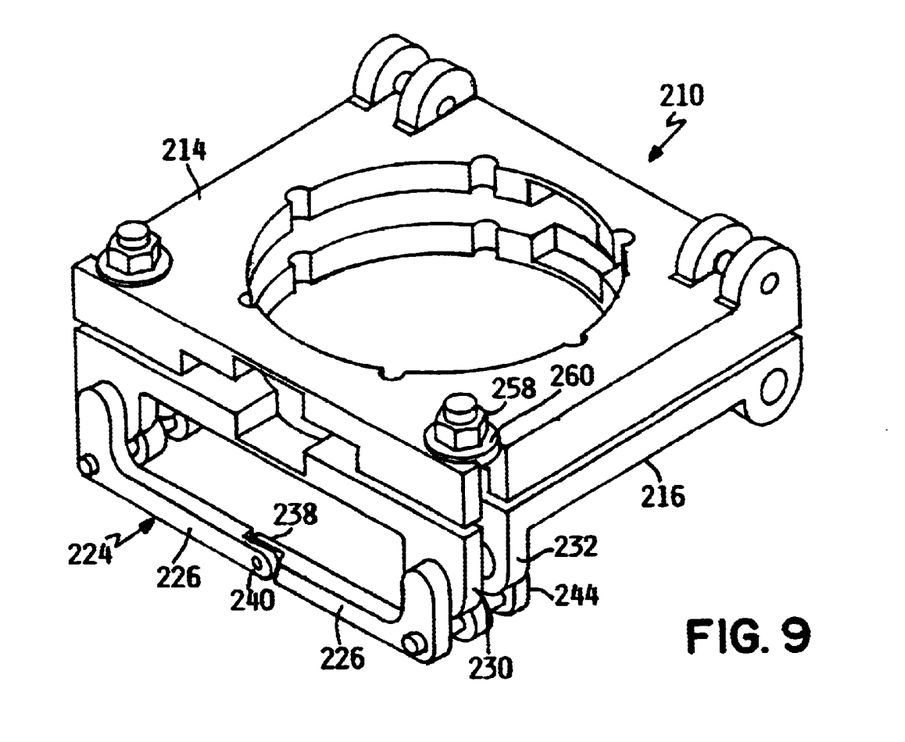
FIG. 9 is a perspective view of a hopper tee mounting assembly, in accordance to a second embodiment.
Figure 10:
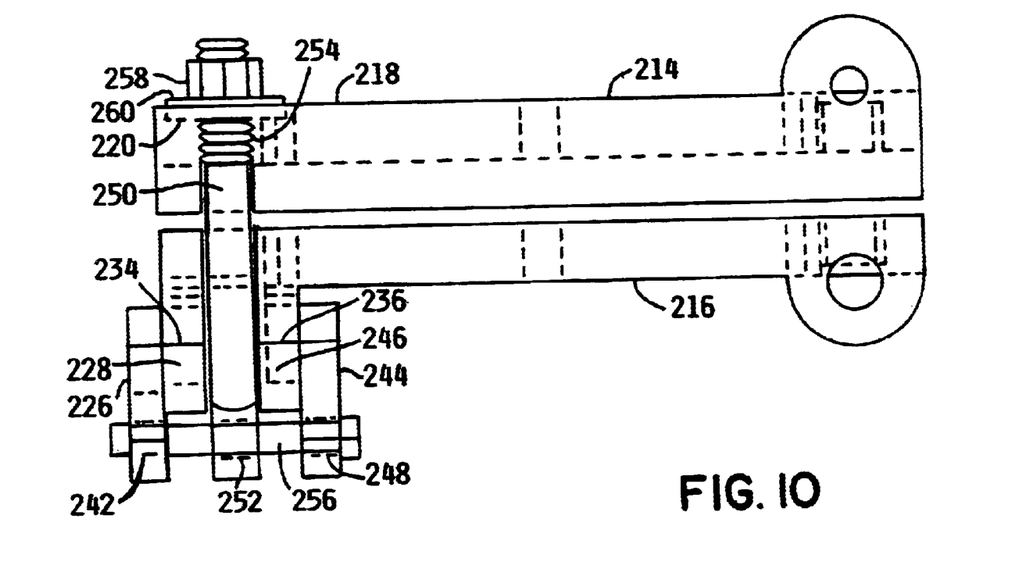
FIG. 10 is a side view of the hopper tee mounting assembly of FIG. 9.

A hopper tee assembly, in accordance to the second embodiment, is illustrated in FIGS. 9 and 10. The second embodiment of the hopper tee mounting assembly 210 is similar to the hopper tee mounting assembly 10 of the first embodiment with the exception of tamper-proof handles.

When delivering certain bulk products, such as food products, a tamper-proof procedure is necessary to assure that no contaminant is introduced into the trailer from the time the dry bulk has been fully loaded into the trailer until the dry bulk is ready to be discharged from the trailer. The tamper-proof procedure usually involves inserting a tie-strap through a set of holes in which the tie-strap must be severed in order for the trailer to be opened. Such tamper-proof procedure allows one to visually inspect the trailer to determine if the trailer has been tampered with before dry bulk is ready to be discharged from the trailer.

The upper plate 214 of the second embodiment of the hopper tee mounting assembly 210 is similar to the upper plate 14 of the first embodiment with the exception of an annular shaped indentation 220 defined on the upper surface 218 of the upper plate 214 at the end of each latch slot 222. The lower plate 216 of the second embodiment is identical to the lower plate 16 of the first embodiment.

Similar to the hopper tee assembly of the first embodiment, the hopper tee assembly of the second embodiment has two latch assemblies 224 for latching together the upper plate 214 with the lower plate 216. Each latching assembly 224 includes an L-shaped handle 226. At one end of the handle is a cylindrical protrusion 228 extending perpendicular from the axis of the handle and into the corresponding latch hole 234 of the forwardly located latch lobe 230, allowing the handle 226 to be pivotably mounted to the lower plate 216. A notch 238 is defined at the elongated end of each handle 226, allowing the ends of the handles to overlap each other when the handles are rotated to the latched position. Also defined at the elongated end of each handle 226 and perpendicular to the axis of the handle is a tamper-proof hole 240. The tamper-proof holes 240 of the two handles 226 are axially aligned with each other when the handles are in the latched positioned. This aligned arrangement of the tamper-proof holes 240 allows a tie-strap (not shown) to be inserted into the tamper-proof holes 240 when the handles are in the latched positioned to provide assurance that the handles have not rotated from the latched positioned. A hole 242 is defined at the bend of the handle and is located a given distance from the cylindrical protrusion 228.

A rear latching bracket 244 is located rearwardly of the rearwardly located latching lobe 232. At one end of the rear latch bracket 244 is a cylindrical protrusion 246 extending perpendicular from the axis of the rear latch bracket and into the corresponding latch hole 236 of the rearwardly located latch lobe 232 allowing the rear latch bracket 244 to be pivotable mounted to the lower plate 216. Located a given distance from the cylindrical protrusion 246 is a hole 248 perpendicular to the axis of the rear latch bracket 244.

An eyebolt 250 is located between the handle 226 and the rear latching bracket 244. The eyebolt 250 has a hole 252 defined perpendicular to the axis of the eyebolt at one end of the eyebolt 250 and external threads 254 formed at the other end of the eyebolt 250. A bolt 256 is inserted through the hole 248 of the rear latching bracket 244, the hole 252 of the eyebolt 250 and the hole 242 of the handle 226. Since the hole 242 of the handle 226 is located a given distance from the cylindrical protrusion 228, a rotational movement of the handle 226 translates into an axial movement of the eyebolt 250.

A nut 258, located upwardly of the upper surface 218 of the upper plate 214, is threaded to the external threads 254 of the eyebolt 250. A rim 260 extends radially outwardly from the bottom of the nut 258. The outer diameter of the rim 260 is sized slightly smaller than the outer diameter of the indentation 220 at the end of the latch slot 222. This allows the rim 260 to be seated within the indentation 220 preventing the eyebolt 250 from pivoting outwardly of the latch slot 222 unless the eyebolt 250 and the nut 258 has moved sufficiently axially upwardy to allow the rim 260 to rise above the indentation 220.

The hopper tee mounting assembly 210 of the second embodiment can be easily opened by rotating the handles 226 from the latched position to the unlatched position. While the handles 226 are in the latched position, the rim 260 of the nut 258 is seated within the indentation 220 of the upper surface 218 preventing the eyebolt 250 from pivoting outwardly out of the latch slot 222. By rotating the handles toward the unlatched position, the eyebolts 250 and the nuts 258 are moved axially upward. Once the handles 226 are in the unlatched position, the rims 260 of the nuts 258 are located above the upper surface 218 of the upper plate 214, allowing the eyebolts 250 of the latch assemblies 224 to pivot outwardly out of the corresponding latch slots 222 of the upper plate 214. Once both latch assemblies 224 have been pivoted out of their corresponding latch slots 222, the lower plate 216 is able to pivot freely relative to the upper plate 214 along the hinge assemblies 262. With the hopper tee mounting assembly 210 pivotably opened, the valve member (not shown) can be removed by lifting it upwardly away from the lower plate 216. The reverse sequence of the opening procedure is used to close the hopper tee mounting assembly of the second embodiment.

While the exemplary valve member 12 disclosed with the hopper tee mounting assemblies 10,210 of the present invention is a valve member similar to the valve members manufactured by Sure Seal Inc., other types of valve members can also be used with the hopper tee mounting assemblies of the present invention. One such other type is a valve member 300, similar to the valve members manufactured by Ultraflo Corp., illustrated in FIGS. 13 and 14.

Figure 13:
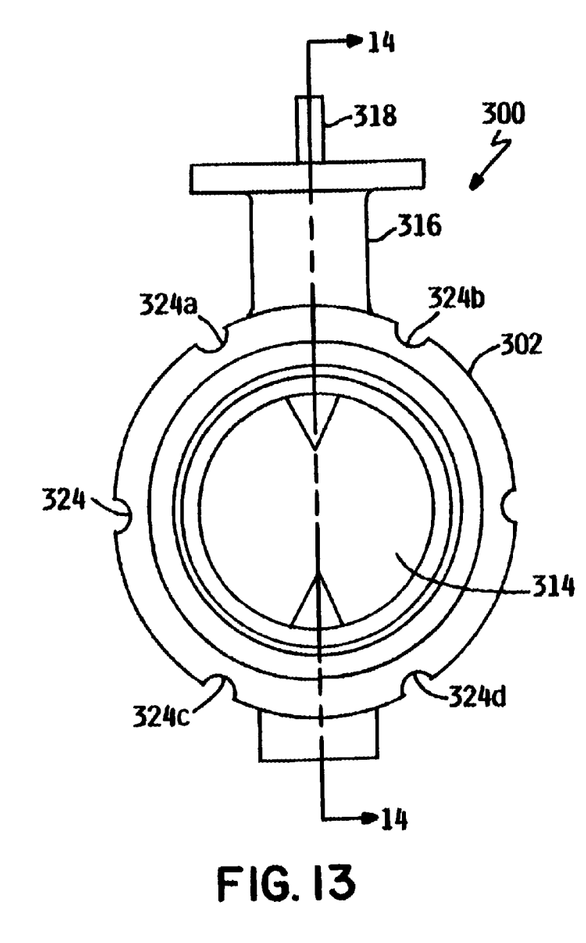
FIG. 13 is a top view of an alternative valve member which can be used with the hopper tee mounting assembly of the present invention.
Figure 14:
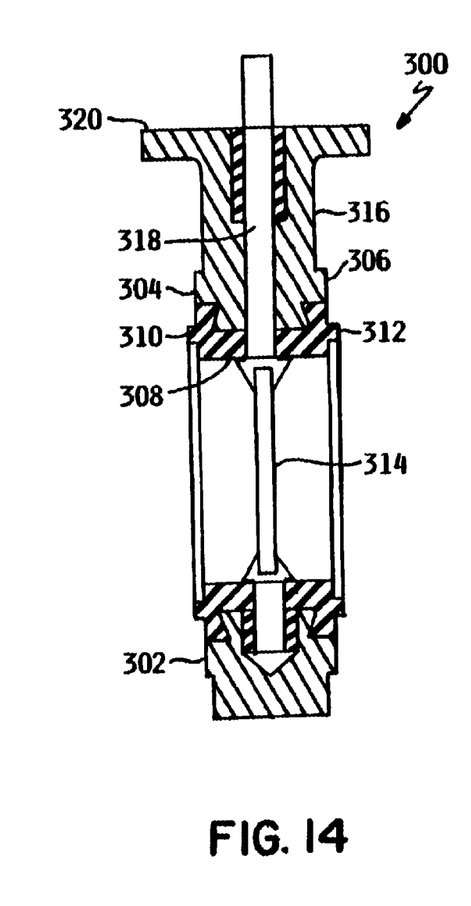
FIG. 14 is a sectional view of the valve member of FIG. 13, as taken along line 13—13.

The valve member 300 has a rigid cylindrical body 302 and a resilient seal 308 located immediately radially inwardly of the cylindrical body 302. One end of the resilient seal 308 protrudes slightly upwardly of the upper surface 304 of the cylindrical body 302. The other end of the resilient seal 308 protrudes slightly downwardly of the lower surface 306 of the cylindrical body 302. Radially inwardly of the resilient seal 308 is a butterfly valve 314. A front boss 316 extends from the front of the cylindrical body 302. The butterfly valve 316 is attached to a stem 318 extending through a bore defined in the front boss 316. The butterfly valve 316 can be manually actuated by an external handle (not shown) attached to a handle mounting flange 36. A rear boss 322 extends from the rear of the cylindrical body 302. The rear boss 322 has a bore defined therein for retaining the end of the stem 318. Six equally spaced retaining apertures 324 are defined on the radially outer surface of the cylindrical body.

As previous discussed, the hopper tee mounting assemblies 10,210 of the present invention can be used for multiple types of valve members. Therefore , the hopper tee mounting assemblies 10,210 of the present invention not only accommodate the valve member 12 but also accommodate the valve member 300. Some of these accommodations of the valve member 300 by the hopper tee mounting assemblies 10,210 of the present invention are described below.

The upwardly extending portion 110$a$,110$b$ of the two bolts 108$a$,108$b$ located near the front of the lower plate 16 are positioned to be inserted into the front retaining apertures 324$a$,324$b$ defined on the radially outer surface of the cylindrical body 302 of the valve member to retain and align the valve member 300. The upwardly extending portions 110$c$,110$d$ of the two bolts 108$c$,108$d$ located near the rear of the lower plate 16 are positioned to be inserted into the rear retaining apertures 324$c$,324$d$ defined on the radially outer surface of the cylindrical body 302 of the valve member to retain and align the valve member 300.

The groove 72 of the upper plate 14 and the groove 112 of the lower plate 16 are sized to accommodate the front boss 316 and the rear boss 322 of the valve member 300.

The upper surface 52 of the upper plate 14 immediately radially outwardly of the upper valve member opening 64, which mates with the flange 18, is approximately flush with the upper surface 304 of the rigid cylindrical body 302 of the valve member 300. The lower surface 94 of the lower plate 16 immediately radially outwardly of the lower valve member opening 104, which mates with the hopper tee, is approximately flush with the lower surface 306 of the rigid cylindrical body 302 of the valve member 300.

The upper surface 52 of the upper plate 14 immediately radially outwardly of the upper valve member opening 64, which mates with flange 18, is below the upper surface 310 of the resilient seal 308 to allow the resilient seal 308 to be compressed against the flange 18 to create an effective seal between the valve member 300 and the flange 18. The lower surface 312 of the lower plate 16 immediately radially outwardly of the lower valve member opening 104, which mates with the hopper tee, is above the lower surface 312 of the resilient seal 308 to allow the resilient seal 308 to be compressed against the hopper tee to create an effective seal between the valve member 300 and the hopper tee.

Various features of the present invention have been described with reference to the above embodiments. It should be understood that modification may be made without departing from the spirit and scope of the invention as represented by the following claims.

What is claimed is:

1. A hopper tee mounting assembly capable of accommodating a valve member within the hopper tee mounting assembly, the hopper tee mounting assembly comprising an upper plate having a plurality of upwardly extending bolts, a lower plate having a plurality of downwardly extending bolts, a hinge assembly allowing the upper plate and the lower plate to pivot relative to each other, and a latch assembly to latch the upper plate together with the lower plate.

2. The hopper tee mounting assembly as claimed in claim 1 wherein said plurality of upwardly extending bolts are in a circular pattern and said plurality of downwardly extending bolts are in a circular pattern.

3. The hopper tee mounting assembly as claimed in claim 2 wherein said plurality of upwardly extending bolts are approximately circumferentially spaced and said plurality of downwardly extending bolts are approximately circumferentially spaced.

4. The hopper tee mounting assembly as claimed in claim 1 wherein each of said downwardly extending bolt has a corresponding upwardly extending bolt in which the axis of the downwardly extending and the axis of the upwardly extending bolt are approximately aligned.

5. The hopper tee mounting assembly as claimed in claim 1 wherein said upper plate has an opening defined therein to allow the valve member to be located radially inwardly of the upper plate.

6. The hopper tee mounting assembly as claimed in claim 5 wherein the upper surface of the upper plate immediately radially outwardly of the opening is approximately flush with the upper surface of a rigid portion of the valve member.

7. The hopper tee mounting assembly as claimed in claim 5 wherein the upper surface of the upper plate immediately radially outwardly of the opening is below the upper surface of a resilient portion of the valve member.

8. The hopper tee mounting assembly as claimed in claim 1 wherein said lower plate has an opening defined therein to allow a bottom portion of the valve member to be located radially inwardly of the lower plate.

9. The hopper tee mounting assembly as claimed in claim 8 wherein the lower surface of the lower plate immediately radially outwardly of the opening is approximately flush with the lower surface of a rigid portion of the valve member.

10. The hopper tee mounting assembly as claimed in claim 8 wherein the lower surface of the lower plate immediately radially outwardly of the opening is above the lower surface of a resilient portion of the valve member.

11. The hopper tee mounting assembly as claimed in claim 1 wherein at least one of said downwardly extending bolt has an upwardly extending portion.

12. A hopper tee mounting assembly capable of accommodating a valve member within the hopper tee mounting assembly, the hopper tee mounting assembly comprising an upper plate, a lower plate, a hinge assembly allowing the upper plate and the lower plate to pivot relative to each other, and two latch assemblies to latch the upper plate together with the lower plate, ends of the two latch assemblies overlap each other when the latch assemblies are in a latched position.

13. The hopper tee mounting assembly as claimed in claim 12 wherein the end of each latch assembly has a hole defined therein, and the holes of the latch assemblies are aligned with each other when the latch assemblies are in the latched position.

14. The hopper tee mounting assembly as claimed in claim 12 wherein said upper plate has a plurality of bolts extending upwardly and said lower plate has a plurality of bolts extending downwardly.

15. A hopper tee mounting assembly capable of retaining a valve member situated between a hopper tee and the bottom of a hopper, the hopper tee mounting assembly comprises a circular flange attached to the bottom of the hopper, an upper mounting piece separate from said circular flange and having a flat surface abutting said flange, a hinge assembly allowing the hopper tee to pivot relative to the upper mounting piece, wherein the location of attachment of said upper mounting piece to said hinge assembly is radially outwardly of the location of abutment of said upper mounting piece to said circular flange.

16. The hopper tee mounting assembly as claimed in claim 15 wherein said valve member abuts said circular flange.

17. The hopper tee mounting assembly as claimed in claim 16 wherein the location of abutment of said circular flange to upper mounting piece is radially outwardly of the location of abutment of said circular flange to said valve member.

18. The hopper tee mounting assembly as claimed in claim 15 further comprising a plurality of cylindrical portions to retain and align the valve member.

19. The hopper tee mounting assembly as claimed in claim 15 wherein said circular flange defines a plurality of equally spaced holes.

20. A hopper tee mounting assembly capable of retaining a valve member situated between a hopper tee and a circular flange attached to the bottom of a hopper, the hopper tee mounting assembly comprises an upper mounting piece separate from said circular flange and having a flat surface abutting said flange, a hinge assembly allowing the hopper tee to pivot relative to the upper mounting piece, wherein the location of attachment of said upper mounting piece to said hinge assembly is radially outwardly of the location of abutment of said upper mounting piece to said circular flange.

21. The hopper tee mounting assembly as claimed in claim 20 wherein said valve member abuts said circular flange.

22. The hopper tee mounting assembly as claimed in claim 21 wherein the location of abutment of said circular flange to upper mounting piece is radially outwardly of the location of abutment of said circular flange to said valve member.

23. The hopper tee mounting assembly as claimed in claim 20 further comprising a plurality of cylindrical portions to retain and align the valve member.

* * * * *